(12) United States Patent
Lupash et al.

(10) Patent No.: US 6,205,377 B1
(45) Date of Patent: Mar. 20, 2001

(54) METHOD FOR NAVIGATION OF MOVING PLATFORM BY USING SATELLITE DATA SUPPLEMENTED BY SATELLITE-CALIBRATED BARO DATA

(75) Inventors: Lawrence O. Lupash, Sunnyvale; Joseph M. Wlad, Alameda, both of CA (US)

(73) Assignee: Trimble Navigation LTD, Sunnyvale, CA (US)

( * ) Notice: Subject to any disclaimer, the term of this patent is extended or adjusted under 35 U.S.C. 154(b) by 0 days.

(21) Appl. No.: 09/300,934

(22) Filed: Apr. 27, 1999

(51) Int. Cl.[7] ............................... H04B 7/185; G06F 7/00

(52) U.S. Cl. ........................... 701/13; 701/207; 701/213; 701/214; 701/215; 342/357.06; 342/357.12; 342/357.15

(58) Field of Search .............................. 701/13, 200, 207, 701/213, 214, 215; 342/357.06, 357.08, 357.11, 357.12, 357.15; 455/12.1, 13.2

(56) References Cited

U.S. PATENT DOCUMENTS

| 5,543,804 | * | 8/1996 | Buchler et al. | 342/357.08 |
| 5,646,857 | | 7/1997 | McBurney | 701/207 |
| 5,820,080 | | 10/1998 | Eschenbach | 244/183 |

* cited by examiner

Primary Examiner—William A. Cuchlinski, Jr.
Assistant Examiner—Yonel Beaulieu
(74) Attorney, Agent, or Firm—Boris G. Tankhilevich

(57) ABSTRACT

The method of supplementing the satellite data by the satellite-calibrated baro data when the receiver autonomous integrity monitoring function (RAIM) is unavailable and when the horizontal protection level (HPL) does not satisfy the horizontal alert limit (HAL) requirement is disclosed. The baro data is calibrated with satellite data if maximum weighted vertical dilution of precision with one satellite removed at one time (max {SubWVDOP}) is less than a predetermined threshold (TSUB) and if a test statistic is less than a predetermined test statistic threshold (TST). The HPL is re-computed using the satellite-calibrated baro data. The re-computed HPL could satisfy the HAL requirement which would make the RAIM function available when it would be otherwise unavailable.

12 Claims, 5 Drawing Sheets

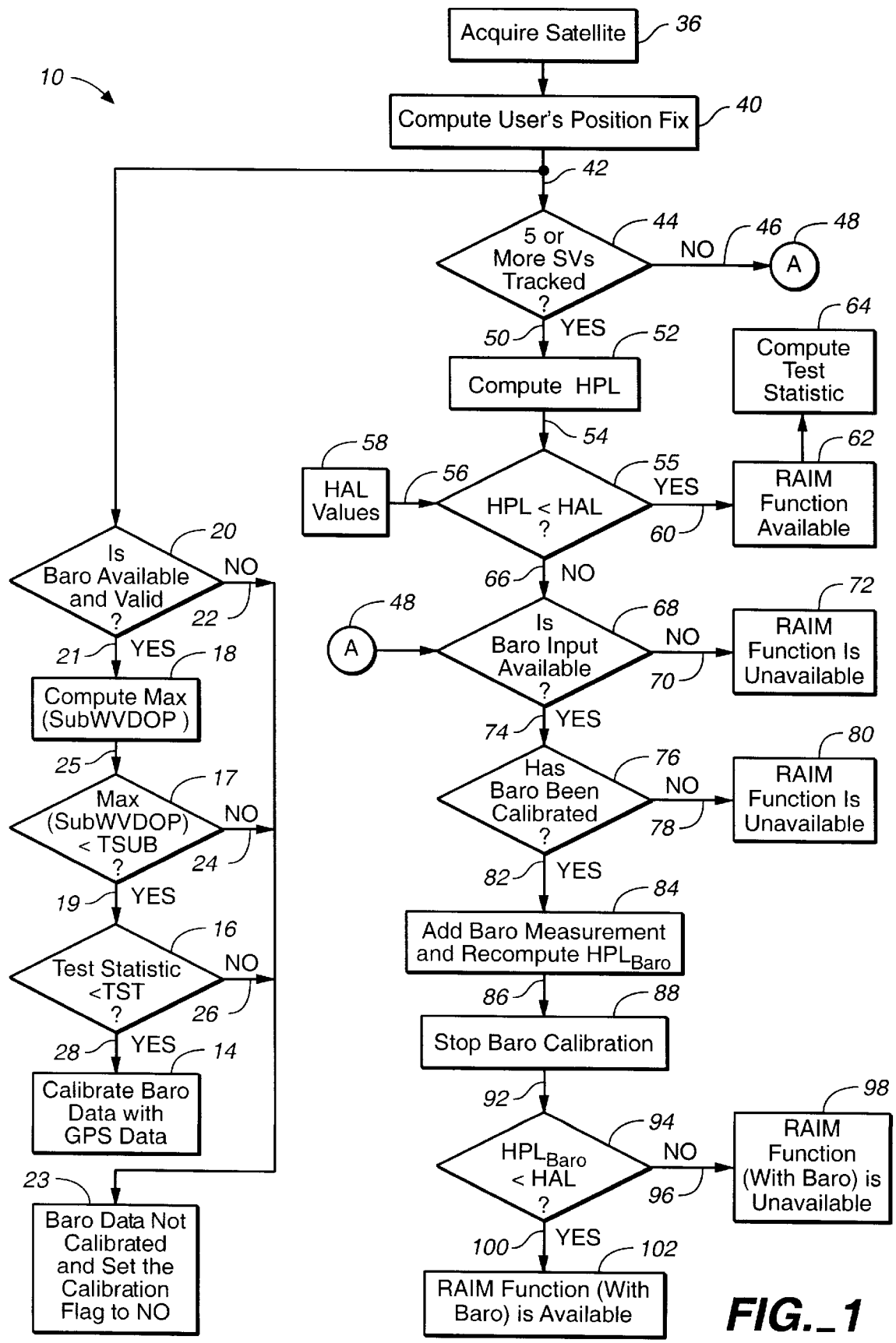
FIG._1

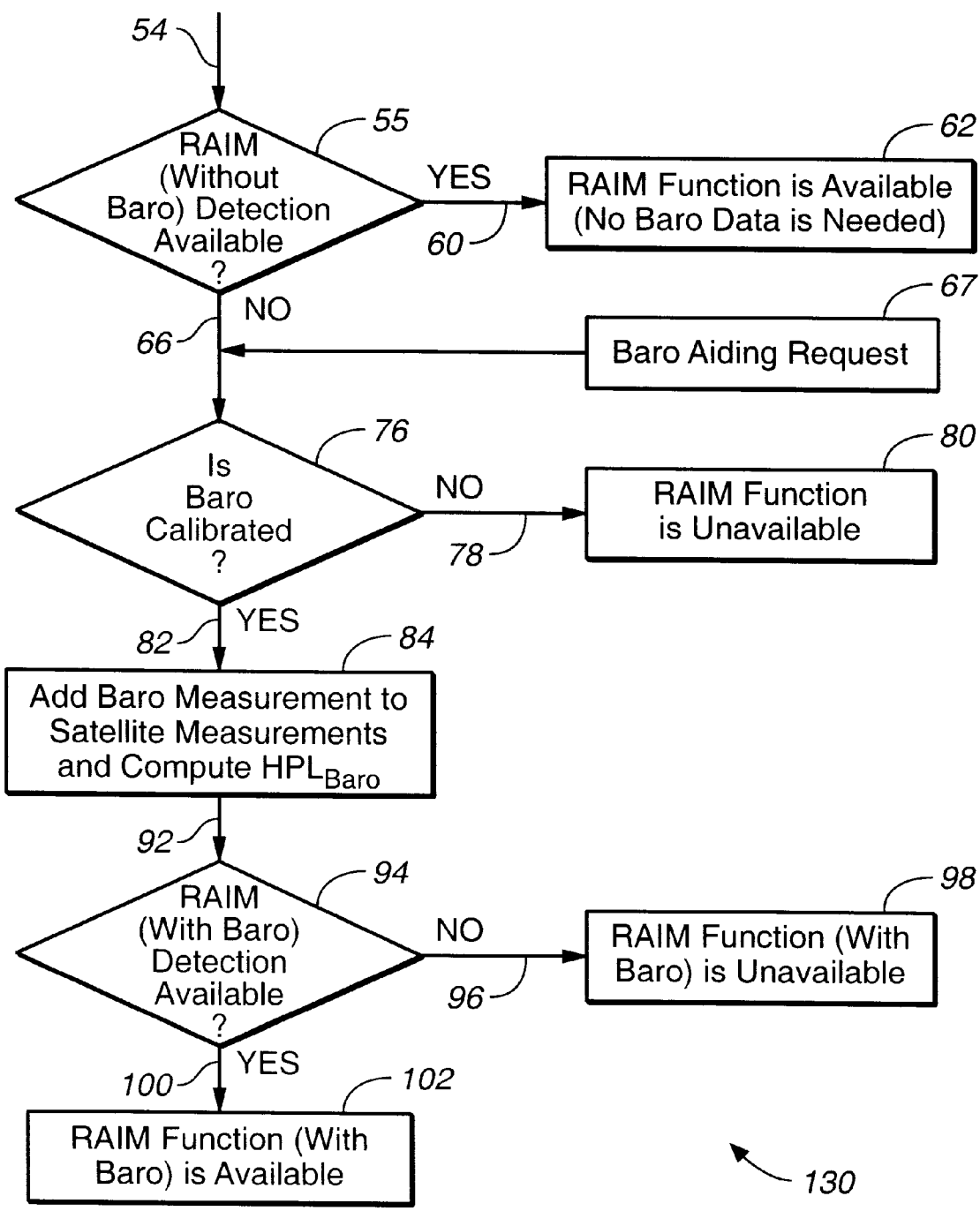
FIG._2

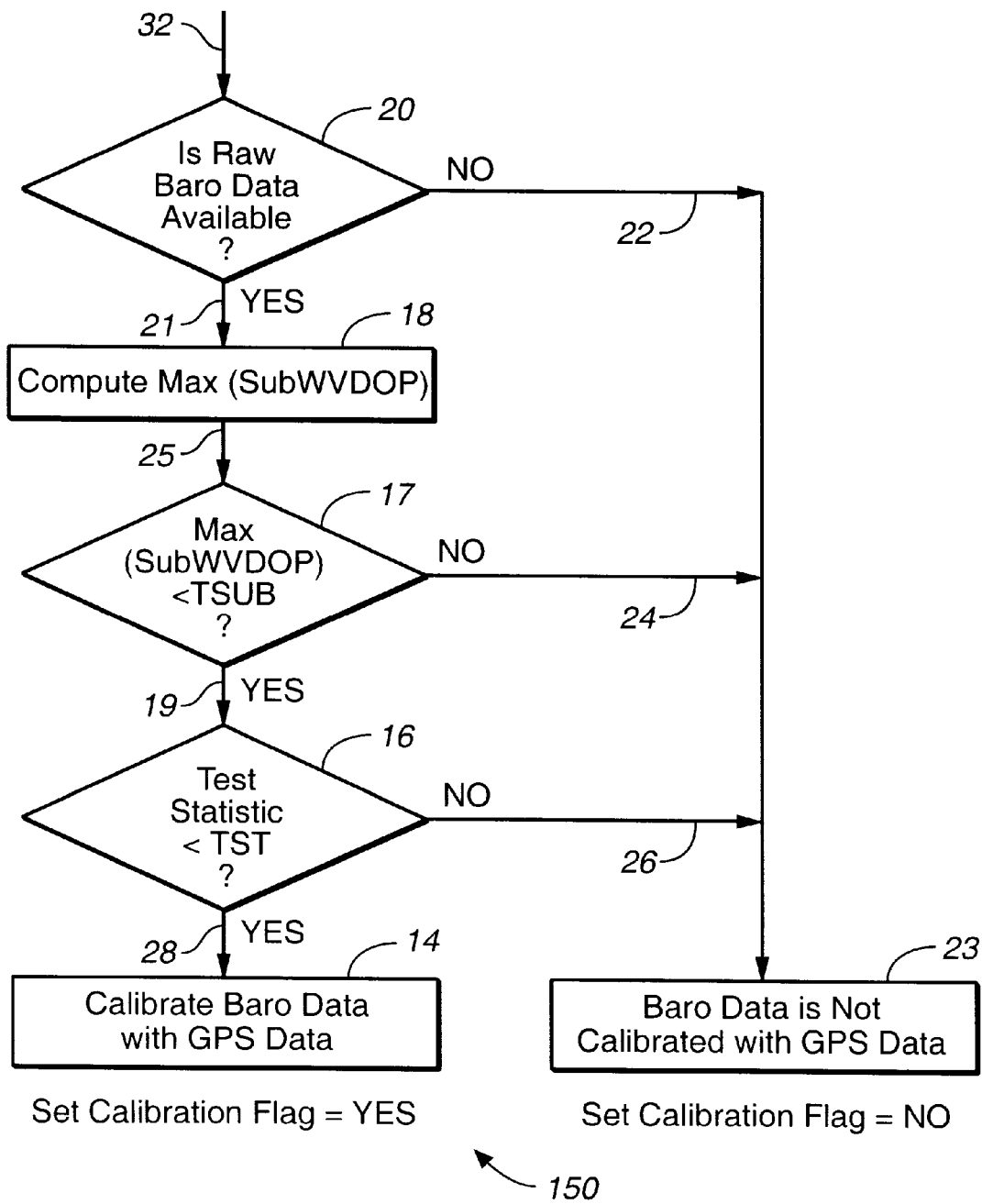
FIG._3

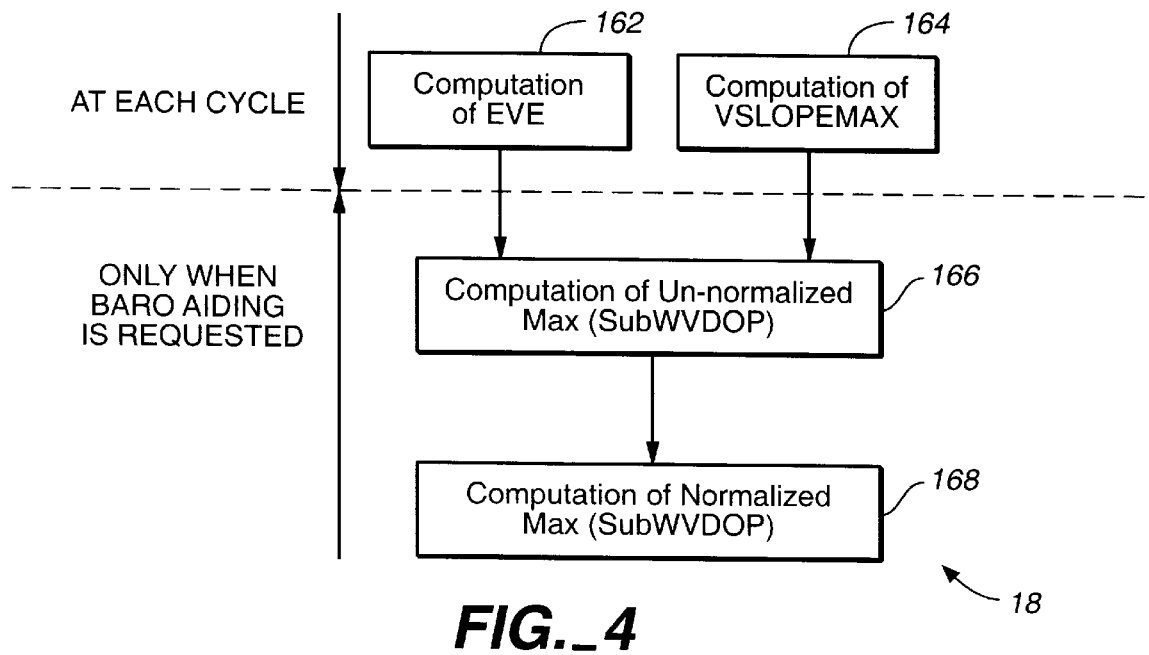
*FIG._4*
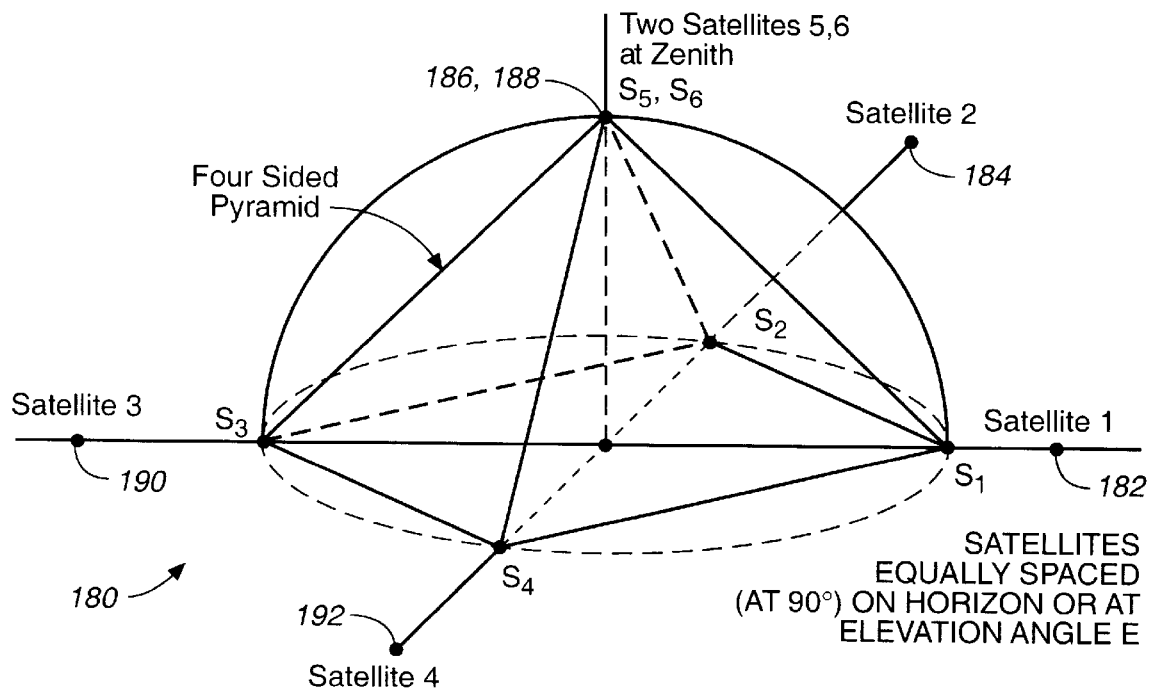
*FIG._5*

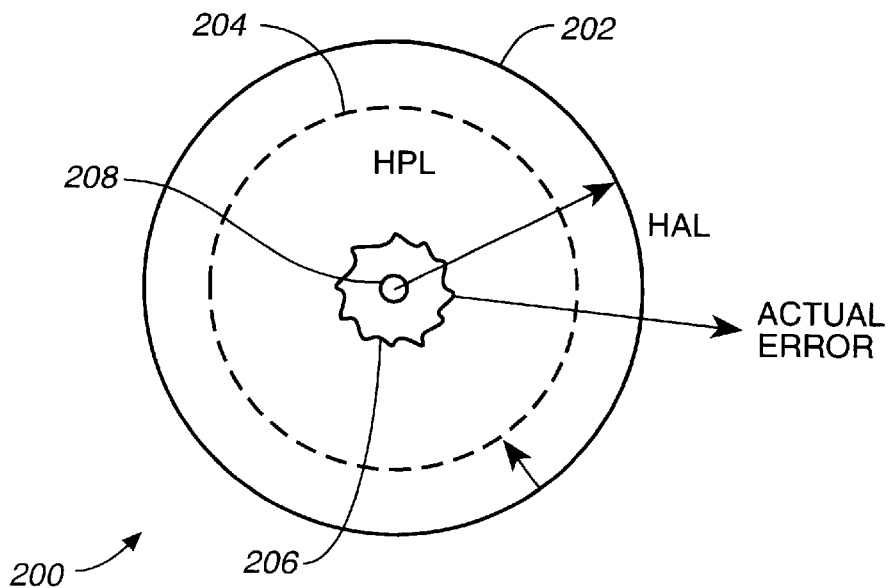
FIG._6
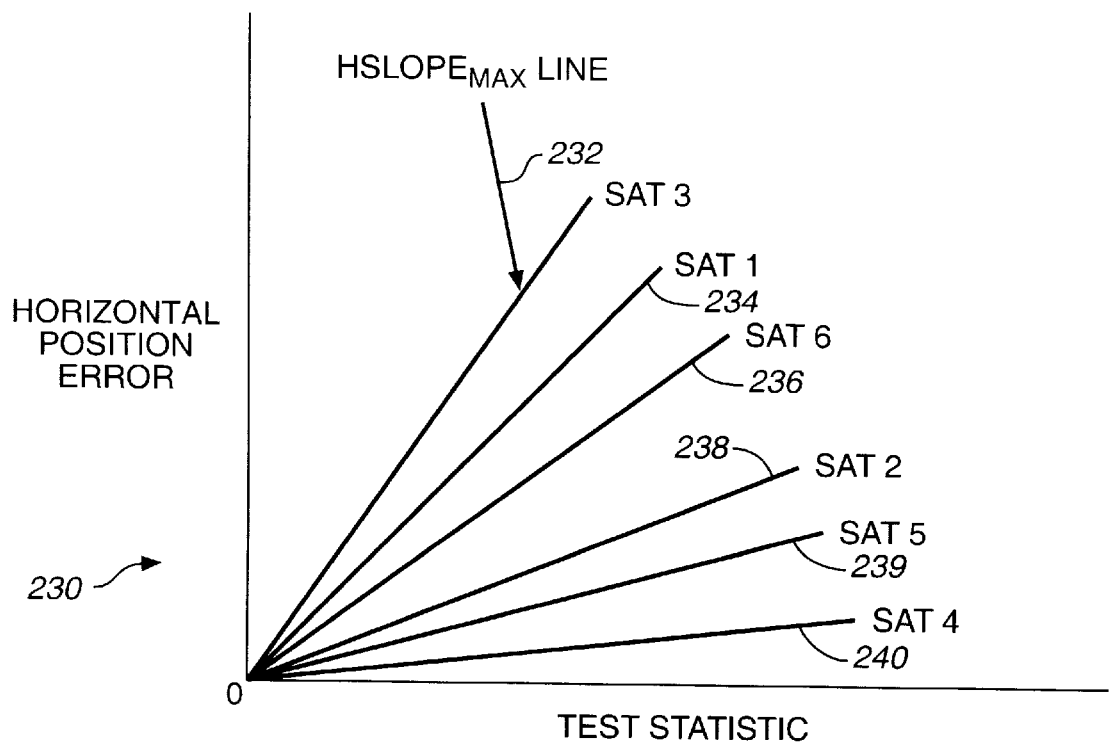
FIG._7

METHOD FOR NAVIGATION OF MOVING PLATFORM BY USING SATELLITE DATA SUPPLEMENTED BY SATELLITE-CALIBRATED BARO DATA

BACKGROUND

The Global Positioning System (GPS) is a system of satellite signal transmitters that transmits information from which an observer's present location and/or the time of observation can be determined. Another satellite-based navigation system is called the Global Orbiting Navigational System (GLONASS), which can operate as an alternative or supplemental system.

The GPS was developed by the United States Department of Defense (DOD) under its NAVSTAR satellite program. A fully operational GPS includes more than 21 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Generally, four or more GPS satellites will be visible from most points on the Earth's surface, which can be used to determine an observer's position anywhere on the Earth's surface. Each satellite carries a cesium or rubidium atomic clock to provide timing information for the signals transmitted by the satellites. An internal clock correction is provided for each satellite clock.

Each GPS satellite continuously transmits two spread spectrum, L-band carrier signals: an L1 signal having a frequency f1=1575.42 MHz (nineteen centimeter carrier wavelength) and an L2 signal having a frequency f2 =1227.6 MHz (twenty-four centimeter carrier wavelength). These two frequencies are integral multiples f1=1,540 f0 and f2=1,200 f0 of a base frequency f0=1.023 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

Use of PRN codes allows use of a plurality of GPS satellite signals for determining an observer's position and for providing the navigation information. A signal transmitted by a particular GPS satellite is selected by generating and matching, or correlating, the PRN code for that particular satellite. Some of the PRN codes are known and are generated or stored in GPS satellite signal receivers operated by users.

A first known PRN code for each GPS satellite, sometimes referred to as a precision code or P-code, is a relatively long, fine-grained code having an associated clock or chip rate of f0=10.23 MHz. A second known PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats.

Accepted methods for generating the C/A-code and P-code are set forth in the document ICD-GPS-200: GPS Interface Control Document, ARINC Research, 1997, GPS Joint Program Office, which is incorporated by reference herein.

The GPS satellite bit stream includes navigational information on the ephemeris of the transmitting GPS satellite (which includes orbital information about the transmitting satellite within next several hours of transmission) and an almanac for all GPS satellites (which includes a less detailed orbital information about all satellites). The transmitted satellite information also includes parameters providing corrections for ionospheric signal propagation delays (suitable for single frequency receivers) and for an offset time between satellite clock time and true GPS time. The navigational information is transmitted at a rate of 50 Baud.

A second satellite-based navigation system is the Global Orbiting Navigation Satellite System (GLONASS), placed in orbit by the former Soviet Union and now maintained by the Russian Republic. GLONASS uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS satellites have circular orbits with a radii of about 25,510 kilometers and a satellite period of revolution of $8/17$ of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of $f1=(1.602+9k/16)$ GHz and $f2=(1.246+7k/16)$ GHz, where k (=1, 2 . . . 24) is the channel or satellite number. These frequencies lie in two bands at 1.597–1.617 GHz (L1) and 1,240–1,260 GHz (L2). The L1 signal is modulated by a C/A-code (chip rate=0.511 MHz) and by a P-code (chip rate=5.11 MHz). The L2 signal is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and demodulating the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS satellites.

The range ($r_i$) between the location of the i-th SATPS satellite and the SATPS receiver is equal to the speed of light c times ($\Delta t_i$), wherein ($\Delta t_i$) is the time difference between the SATPS receiver's clock and the time indicated by the satellite when it transmitted the relevant phase. However, the SATPS receiver has an inexpensive quartz clock which is not synchronized with respect to the much more stable and precise atomic clocks carried on board the satellites. Consequently, the SATPS receiver estimates a pseudo-range ($pr_i$) (not a true range) to each satellite.

After the SATPS receiver determines the coordinates of the i-th SATPS satellite by demodulating the transmitted ephemeris parameters, the SATPS receiver can obtain the solution of the set of the simultaneous equations for its unknown coordinates ($x_0$, $y_0$, $z_0$) and for unknown time bias error (cb). The SATPS receiver can also determine velocity of a moving platform.

The given above discussion assumes that a satellite navigational system used for the navigation purposes is functioning properly.

GPS satellites can provide users with warnings of satellite malfunctions. Sometimes, the warnings may take more than 5 minutes before the user is aware of a malfunction.

Aviation applications require a more timely notification of a satellite failure condition. Thus, a means to independently monitor satellite integrity is required.

One of these means is receiver autonomous integrity monitoring (RAIM). The RAIM method is based on a self-consistency check among the available measurements. The RAIM consistency check uses redundant measurements as a means to determine GPS integrity.

The discussion given below can be found in "Global Positioning System: Theory and Applications", Volume II, chapter 5, by Bradford W. Parkinson and James J. Spilker Jr., published by the American Institute of Aeronautics and Astronautics, Inc. in 1996.

There are two main approaches to RAIM (not considering several hybrid approaches).

In the first main method, the snapshot scheme, only current redundant measurements are used for the self-consistency check. In the second main method, the averaging or filtering scheme, both past and present measurements are used in the RAIM decision.

The theoretical foundation for RAIM is statistical detection theory. Two hypothetical-testing questions are posed: (1) Does a failure exist? and (2) If so, which is the failed satellite? The basic assumption is that there is only one failed satellite at a time. Determination of which satellite has failed is more difficult than a simple failure detection, and it requires more measurement redundancy.

The Radio Technical Commission for Aeronautics (RTCA) published its Minimum Operational Performance Standards (MOPS) for GPS as a supplemental navigation system in July 1991 (Document RTCA /DO-208). The main requirements are shown in Table 1 (see below). The maximum allowable alarm rate in Table 1 refers to the usual false alarm rate with no satellite malfunction. The specification requires that both the detection and alarm-rate specification should be met globally at all times, otherwise the satellite geometry should be declared as inadmissible for integrity purposes.

In a basic snapshot RAIM scheme the noisy redundant range-type measurements are available at a given sample point in time. It is convenient to use the six-satellites-in-view-case as an example, that is the number of satellites in view N=6. The generalization to N=5 or N>6 is fairly obvious.

In a range comparison method for six satellites there are six linearized over-determined equations in four unknowns. If there is no noise, one can solve the first four equations to obtain a solution that satisfies the first four equations. The resulting solution can be used to predict the remaining two measurements, and the predicted values can be compared with the actual measured values. If the two differences (residuals) are small, the detection algorithm detects "no failure". On the other hand, if either or both of the residuals are large, it declares "failure". The notion of "small" and "large" are defined by deciding whether the typical sample point lies inside or outside the decision boundary in the two-dimensional test statistic plane. This is the essence of the range comparison method.

TABLE 1

| Phase of Flight | Horizontal Alert Limit (HAL) | Maximum allowable false rate | Time to alarm | Minimum Detection Probability |
|---|---|---|---|---|
| En route (oceanic, domestic, random, & J/V routes) | 2.0 n. mi. | 0.002/h | 30 s | 0.999 |
| Terminal | 1.0 n. mi. | 0.002/h | 10 s | 0.999 |
| RNAV approach, non-precision | 0.3 n. mi. | 0.002/h | 10 s | 0.999 |

In the least-squares -residuals RAIM method for the same six-in-view satellites example, one obtains the least squares "solution" for six equations in four unknowns. The least-squares solution can be used to predict the six measurements. Six residuals are then grouped together as a six-to-one vector in the measurement domain. The linear transformation takes the range measurement into the resulting residual vector. The sum of the squares of the residuals plays the role of the basic nonnegative scalar observable in the least-squares -residuals RAIM method. The positive semi-infinite real line can be partitioned into two parts, one for "no failure", and the other for "failure". The dividing point is called the threshold. In this method one can use a constant alarm-rate strategy by precalculating the thresholds (partitions) that yield the desired alarm rate for the various anticipated values of N. (In general, N is equal to the number of measurements). Then the real-time algorithm sets the threshold appropriately. For the zero-mean Gaussian assumption the sum of the squares of the residuals has an unnormalized chi-square distribution with (N-4) degrees of freedom. One can use chi-square statistics to find the threshold based on false alarm rate and missed detection rate for the N- number of measurements used. The sum of the squares of the residuals, which is a scalar, is used as the test statistic which is compared to the threshold. Thus, the least-squares-residuals RAIM method is easy to implement because its test statistic is a scalar, regardless of the number N of measurements used.

The RAIM parity method is more formal and less heuristic than either the range comparison method or the least-squares-residuals method. In this method, for the same six-in-view satellites example, the measurement vector is linearly transformed. The upper partitioned part of the transformation yields the usual least-squares solution. The lower partitioned is called the parity vector. For simple detection, one can obtain all the information about the parity vector by looking at its magnitude, or its magnitude squared. Thus, in the parity method, the test statistic for detection reduces to a simple scalar, as was the case with the least-squares-residuals method. The least-squares-residuals method and the parity method lead to identical observables, and with similar threshold settings, yield identical results. It can be shown, that the range-comparison space can be mapped to parity space. Thus, all three methods yield the same results.

Another RAIM implementation is the maximum separation of solution RAIM method. If there are N satellites in view, one can consider the N subset solutions obtained by omitting one satellite at a time from the full set. If a failure exists, the failed satellite is omitted from one of the subsets, and the solution thus obtained is declared a "good" solution. All other subsets contain the failed satellite, and they are in error to various degrees. If the pseudorange error in the failed satellite gradually increases with time, one would expect the subset solutions to begin to spread apart with time, and the maximum separation observed among the N solutions can be used as a measure of the solutions spread. The "good" solution remains near truth, because it does not contain the failed satellite. If there is no failure present, the solutions should remain grouped around the true position. Thus, the maximum observed solution separation in the horizontal plane can be used as a scalar and nonnegative test statistic. The "no-failure" decision is separated from the "failure" decision with some detection probability by the threshold that can be set by utilizing the relationship between the radial error and the radial-error-protection level. The detection probability varies with satellite geometry. However, this method is not practical because it requires N solutions.

In the constant-detection-rate/variable-protection-level method, a snapshot RAIM scheme differs significantly from the four methods described above. In this method, the parity vector is used as the basic test statistic, and a threshold is set to yield the desired constant alarm rate. To keep the detection probability constant, as the satellite geometry varies, the smallest radial error, or the protection radius, is used as a failure criterion. The protection radius can be calculated, in real time, on an essentially continuous basis. The variable-detection-level method could be used within the context of the RTCA specifications where fixed, discrete alarm limits are set for each phase of flight, as shown in Table. 1. When the protection radius exceeds the specified alarm limit, the alarm should be triggered, which would indicate the inadequate satellite geometry. On the other hand, if the test statistic exceeds the threshold, the alarm also would be triggered. If this is the case, the alarm would be indicative of a satellite malfunction. In either of those situations, the RTCA MOPS precludes satellite-only navigation. Thus, an airplane should be equipped with an alternative source of navigation when the satellite-based navigation fails. This is called a GPS supplementary navigation.

The supplementary navigation of an airplane can be performed by using both satellite-derived data and non-satellite-derived data, like barometric altimeter data (baro-data), for example. However, baro data that can assist in detection of the satellite failure should be satellite-calibrated first.

Thus, what is needed is a method of a satellite supplementary navigation of a moving platform by using both satellite-derived data and satellite-calibrated baro data.

SUMMARY

The present invention is novel and unique because it discloses a method for supplementary navigation of a moving platform using satellite data supplemented by satellite-calibrated barometric altimeter (baro) data. The moving platform includes a satellite receiver and a barosensor.

In one embodiment, the method of the present invention comprises the following steps: (1) acquiring a plurality of satellite signals; (2) checking whether a satellite configuration is substantially sufficient; (3) if the satellite configuration is substantially sufficient, and if the satellite data obtained from the substantially sufficient satellite configuration utilizing the satellite receiver is substantially sufficient, utilizing the satellite data for obtaining position fixes of the moving platform; and (4) if the satellite configuration is not substantially sufficient, or if the satellite data obtained from the substantially sufficient satellite configuration is not substantially sufficient, supplementing the satellite data by the satellite-calibrated baro data obtained utilizing the barosensor.

In one embodiment, the satellite configuration includes a GPS satellite configuration, a satellite receiver includes a GPS satellite receiver, and satellite calibrated baro data includes GPS-calibrated baro data.

In one embodiment, the step (2) of checking whether the satellite configuration is substantially sufficient further includes the steps of: (2,1) continuously determining a number N of visible satellites being tracked by the satellite receiver, wherein N is an integer; and (2,2) declaring the satellite configuration as substantially sufficient if the number N of satellites being tracked is greater than a predetermined number K, wherein K is an integer.

The step of checking whether the satellite configuration is substantially sufficient further includes the steps of: continuously determining a number N of visible GPS satellites being tracked by a GPS receiver; and declaring the satellite configuration as substantially sufficient if the number N of GPS satellites being tracked is greater than a predetermined number.

In one embodiment, the predetermined number K is equal to 4 for a three-dimensional determination of position fixes of the moving platform.

In another embodiment, the predetermined number K is equal to 3 for a two-dimensional determination of position fixes of the moving platform.

In one embodiment, the step (3) of checking whether the satellite data obtained from the substantially sufficient satellite configuration is substantially sufficient further includes the steps of: (3,1) continuously computing a horizontal protection level (HPL) and a vertical protection level (VPL); (3,2) checking whether the horizontal protection level (HPL) is less than a horizontal alert limit (HAL); (3,3) if the horizontal protection level (HPL) is less than the horizontal alert limit (HAL), declaring a receiver autonomous integrity monitoring (RAIM) function available and declaring the satellite data obtained by using the satellite receiver as substantially sufficient for obtaining position fixes of the moving platform; and (3,4) if the horizontal protection level (HPL) is greater than the horizontal alert limit (HAL), declaring the receiver autonomous integrity monitoring (RAIM) function unavailable and declaring the satellite data obtained by using the satellite receiver as not substantially sufficient for supple mental navigation of the moving platform.

In one embodiment, the step (4) of supplementing the satellite data by the satellite-calibrated baro data further includes the steps of: (4,1) checking whether the baro data is satellite-calibrated; (4,2) if the baro data is satellite-calibrated, adding the satellite-calibrated baro data to the satellite data to recompute the horizontal protection level (HPL) in order to obtain a baro-calibrated horizontal protection level ($HPL_{baro}$) and in order to activate the receiver autonomous integrity monitoring (RAIM) function; (4,3) checking whether the baro-calibrated horizontal protection level (HPL$_{baro}$) is less than the horizontal alert limit (HAL); (4,4) if the baro-calibrated horizontal protection level (HPL$_{baro}$) is less than the horizontal alert limit (HAL), declaring the receiver autonomous integrity monitoring (RAIM) function available; and (4,5) if the baro data is not satellite-calibrated, declaring the receiver autonomous integrity monitoring (RAIM) function unavailable.

In one embodiment, the step of calibrating the baro data with the satellite data further includes the steps of: (a) checking whether a raw baro data is available and valid; (b) if the raw baro data is available and valid, computing a maximum weighted vertical dilution of precision with one satellite removed at one time (max {SubWVDOP}); (c) checking whether the max {SubWVDOP} is less than a predetermined threshold (TSUB); (d) if the max {SubWVDOP} is less than TSUB, checking whether a test statistic is less than a predetermined test threshold (TST); (e) if the max {SubWVDOP} is less than the TSUB and if the test statistic is less than the TST, calibrating the raw baro data with the satellite data; and (f) if the raw baro data is not available or not valid, or if max {SubWVDOP} is greater than the TSUB, or if the test statistic is greater than the TST, declaring the satellite data as unfit for calibrating the raw baro data.

In one embodiment, the step (b) of computing max {SubWVDOP} further includes the steps of: (b1) using a computed vertical protection level (VPL) of the configuration of the visible satellites for the computation of a vertical slope maximum (VSLOPEMAX); (b2) identifying an estimated vertical error (EVE) for the configuration of visible satellites; (b3) inputting the pre-computed vertical slope maximum (VSLOPEMAX) and the pre-computed estimated vertical error (EVE); (b4) computing an unnormalized maximum weighted vertical dilution of precision with one satellite removed at one time, Un_normalized_max {SubWVDOP} for the visible satellites by utilizing the EVE and the VSLOPEMAX; and (b5) computing a normalized maximum weighted vertical dilution of precision, Normalized_max {SubWVDOP} by using the Un_normalized_max {SubWVDOP}.

BRIEF DESCRIPTION OF THE DRAWINGS

FIG. 1 depicts a detailed flow chart of RAIM parameters computation.

FIG. 2 illustrates the RAIM detection availability test.

FIG. 3 depicts the flow chart of the baro data calibration using the GPS data.

FIG. 4 shows the flow chart of method of computation of (max{SubWVDOP}).

FIG. 5 depicts an example of a six-in-view satellite configuration.

FIG. 6 shows a relationship between the HPL and actual error in position fixes.

FIG. 7 illustrates a plurality of characteristic horizontal slopes for a six-in-view satellite configuration.

FULL DESCRIPTION OF THE PREFERRED EMBODIMENTS

In one embodiment, the method of the present invention includes a method for supplemental navigation of a moving platform using satellite data supplemented by satellite-calibrated baro data. A moving platform should include a satellite receiver and a barosensor. The satellite system can include a GPS system, a GLONASS system, a combined GPS/GLONASS system or any other satellite positioning system (SATPS). The satellite receiver can include a GPS receiver, a GLONASS receiver, a combined GPS/GLONASS receiver, or any other satellite receiver configured to receiver the satellite signal emanated by the utilized satellite system.

In the preferred embodiment of the present invention, the satellite system includes GPS system, a satellite receiver includes a GPS receiver, and FIG. 1 depicts a detailed flow chart (10) of a method for supplemental navigation of a moving platform using GPS data supplemented by GPS—calibrated baro data.

The first step (36) of method (10 of FIG. 1)) is a step of acquiring a plurality of GPS satellite signals. The next step (40 of FIG. 1) is a step of computation of GPS position fixes using only GPS—derived data.

The next step (44 of FIG. 1) is a step of checking how many satellites (SV's) are being tracked by the GPS receiver.

In general, if six or more satellites are being tracked, the GPS receiver can isolate a failed satellite. This means, that the GPS receiver can perform the complete receiver autonomous integrity monitoring (RAIM) function without supplementing the GPS data with any other navigation data, including baro data.

If only five satellites are being tracked, the GPS receiver can perform fault detection using receiver autonomous integrity monitoring (RAIM) without supplementing the GPS data with any other navigation data, but in some cases baro data would be needed to perform a complete RAIM function including fault detection and fault isolation/exclusion.

Thus, if in step (44) the number of GPS satellites being tracked is 5 or more, the GPS receiver can compute the horizontal protection level (HPL) (52) based on satellite geometry given by the measurement observation matrix (H), and based on the noise factor given by the weighting factor matrix (R). The computed HPL can be utilized to determine RAIM fault detection availability.

If, on the other hand, in step (44) the number of GPS satellites being tracked is less than 5, the GPS receiver cannot execute the RAIM function without using baro data. If this is the case, the next step is the step (68).

The RAIM function provides a timely warning of a satellite failure. All RAIM schemes employ some form of consistency check among redundant measurements. A commonly used quantitative indicator of such consistency is the sum of the squares of the range residuals, or its equivalent in parity space. This quantitative indicator, or its square root, is used as the test statistic in the particular RAIM scheme that is utilized in the present patent application.

In addition to providing a timely warning of a satellite failure, the RAIM function can be also utilized to provide a performance index. The protection parameter that is applicable to fault detection only (in contrast to fault detection and isolation/exclusion) is referred to as horizontal protection level (HPL). The protection parameters of interest are the horizontal protection level (HPL) and the vertical protection level (VPL). The test statistic is the sum-of-the-squared-range-residuals (or its square root) and its chi-square distribution.

FIG. 7 depicts a plurality (230) of characteristic slopes for 6-in-view satellites (182, 184, 186, 188, 190, and 192 of FIG. 5). Plots of position errors versus test statistic are helpful in visualizing the RAIM detection situation.

For 6-in-view satellites example of FIG. 5, FIG. 7 shows the relationship between the test statistic and the induced horizontal position errors. For the slopes (232–240) it can be shown that the maximum horizontal slope is obtained by maximizing over all horizontal slopes:

$$\text{HSLOPE}_{max} = \max_{over\ all\ i-\ measurements}[\text{HSLOPE(i)}]. \quad (1)$$

The satellite with the largest horizontal slope is the satellite whose failure is most difficult to detect. Indeed, for a given pseudorange bias, the $\text{HSLOPE}_{max}$ satellite is the one that yields the smallest test statistic.

In the example of FIG. 7, it is the satellite number 3 that has the $\text{HSLOPE}_{max}$ (232). Thus, in this example, the satellite number 3 is the satellite whose failure is most difficult to detect.

FIG. 6 shows a relationship (200) between the HPL (204) and actual error (206) in position fixes determined by GPS receiver using only GPS-derived data.

As depicted in FIG. 6, if the horizontal protection level HPL (204) is depicted by the radius of a circle, and if the actual error in position determination (206) is less than HPL, a faulty satellite signal will be detected with probability greater than the imposed probability, e.g. 0.999.

The horizontal alert limit (HAL) requirement in the position determination of an airplane for different phases of flight is given above in Table I.

Referring back to FIG. 1, the GPS receiver computes the horizontal protection level (HPL) in the step (52) in order to compare HPL with the horizontal alert limit (HAL) in the step (55).

These steps (computation and testing) comprise the RAIM detection availability test (130), as depicted in FIG. 2.

If HPL<HAL, then the RAIM function is available (block 62), and one can compute the RAIM test statistic (block 64) in order to detect the potential faulty satellite.

However, if HPL>HAL, then the RAIM function is not available (logic arrow 66 of FIG. 1), and one can use the supplemental baro data in order to re-compute the baro-dependent horizontal protection level $\text{HPL}_{baro}$ (block 84 of FIG. 1). In this way, the $\text{HPL}_{baro}$ can be made less than the HAL (block 94 of FIG. 1), thereby activating the RAIM function.

Now, assuming that HPL>HAL, the issue is how to use the baro data to supplement the GPS-derived data in order to re-compute the baro-dependent horizontal protection level $\text{HPL}_{baro}$.

Referring back to RAIM detection availability test (130) of FIG. 2, before one can add the baro data to the insufficient GPS data, one should ask several questions.

The first question is whether the baro input is available and valid (blocks 20 and 68 of FIG. 1). If the answer is yes (logic arrow 74 of FIG. 1), the next question is whether the baro data has been calibrated (block 76 of FIGS. 1 and 2). If baro data is not or cannot be calibrated (logical arrow 78 of FIGS. 1 and 2), the RAIM function is unavailable and cannot be made available by using the baro data (block 80 of FIGS. 1 and 2). If, on the other hand, the baro data has been calibrated, it can be used to re-compute horizontal protection limit to satisfy the new test $\text{HP}_{baro}$<HAL (block 94 of FIGS. 1 and 2).

If the new test $\text{HPL}_{baro}$<HAL has been satisfied (94 of FIGS. 1 and 2), the RAIM function is available again and can be used to monitor the integrity of the satellite system (block 102 of FIGS. 1 and 2).

On the other hand, if even the new test $\text{HPL}_{baro}$<HAL has not been satisfied, the unavailable RAIM function can not be made available again and cannot be used to monitor the integrity of the satellite system (block (98 of FIGS. 1 and 2).

FIG. 3 depicts the flow chart (150) of baro data calibration using the GPS data.

Assuming that the raw baro data is made available (in one embodiment, by using a barosensor) (20 of FIGS. 1 and 3), one has to check the sufficiency of the satellite configuration by computing a maximum weighted vertical dilution of precision (max {SubWVDOP}). The sub-weighted vertical dilution of precision SubWVDOP is defined as the values of the weighted vertical dilution of precision for all satellite subsets obtained by eliminating one satellite at one time from the original set.

If the max {SubWVDOP} is less than a predetermined value TSUB (17 of FIGS. 1 and 3), one has to further test whether the test statistic is less than a predetermined test statistic threshold (TST (16 of FIGS. 1 and 3). If the answer is yes (logical arrow 28 of FIGS. 1 and 3), the baro data can be calibrated with the GPS data.

In one embodiment, TSUB is equal to 5.

If the raw baro data is not available or not valid, or if max {SubWVDOP} is greater than TSUB, or if the test statistic is greater than the test threshold, the raw baro data is unfit for calibration using GPS data (block 23 of FIGS. 1 and 3).

FIG. 4 shows the method (18 of FIGS. 1 and 4) of computation of the maximum weighted vertical dilution of precision (max {SubWVDOP}).

At each navigation solution computation cycle, regardless of whether there is a baro aiding request (67 of FIG. 2) or not, EVE (defined as the estimated vertical error in the user's position) (block 162 of FIG. 4) and VSLOPEMAX (164 of FIG. 4) is computed by using the measurement observation matrix H and the weighting factor matrix R.

EVE is, in fact, an un-normalized weighted dilution of precision (WDOP) with all satellites included.

The ability to accurately calibrate the barometric data is based upon the vertical dilution of precision.

For the same reason, instead of computation of the horizontal HSLOPEMAX, one should focus on the computation of the VSLOPEMAX (block 164 of FIG. 4) as the most relevant maximum slope characteristic, that is the slope maximum in the vertical plane. If vertical protection level (VPL) is known instead of VSLOPEMAX, then VSLOPEMAX can be determined as follows:

$$\text{VSLOPEMAX} = \text{VPL}/(\sqrt{\lambda_B}); \quad (2)$$

wherein $\lambda_B$ is the non-centrality parameter in the chi-square distribution, a pre-computed value depending on degrees of freedom, probability of false alarm, and probability of missed detection.

When the baro aiding request is made (67 of FIG. 2), the computation of the max {SubWVDOP} is undertaken by inputting the pre-computed vertical slope maximum (VSLOPEMAX) computed at each navigation solution cycle, and the pre-computed estimated vertical error (EVE).

At first, an unnormalized maximum weighted vertical dilution of precision Unnormalized_max {SubWVDOP} is computed by utilizing the EVE and the VSLOPEMAX (block 166 of FIG. 4) as follows:

$$\text{Unnormalized\_max }\{\text{SubWVDOP}\} = \sqrt{((\text{EVE})^2 + (\text{VSLOPEMAX})^2)}. \quad (3)$$

Finally, the normalized maximum weighted vertical dilution of precision (Normalized_max {SubWVDOP}) is computed (block 168 of FIG. 4) by using the Unnormalized max {SubWVDOP}.

The current approach to compute the max {SubWVDOP} is based on the original formula linking the weighted vertical dilution of precision, the vertical slopemax, and the maximum weight to the max {SubWVDOP} thus eliminating the need to compute weighted vertical dilution of precision for all satellite subsets when one satellite is removed.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. A method for satellite supplementary navigation of a moving platform using a satellite data supplemented by a satellite- calibrated baro data; said moving platform including a satellite receiver and a barosensor; said method comprising the steps of:

(a) checking whether a satellite configuration is substantially sufficient;

(b) if said satellite configuration is substantially sufficient, acquiring a plurality of satellite signals from said substantially sufficient satellite configuration;

(c) checking whether a set of satellite data obtained from said substantially sufficient satellite configuration utilizing said satellite receiver is substantially sufficient:

(d) if said satellite configuration is substantially sufficient, and if said satellite data obtained from said substantially sufficient satellite configuration utilizing said satellite receiver is substantially sufficient, utilizing said satellite data for obtaining position fixes of said moving platform; and (e) if said satellite configuration is not substantially sufficient, or if said satellite data obtained from said substantially sufficient satellite configuration is not substantially sufficient, supplementing said satellite data by said satellite-calibrated baro data obtained utilizing said barosensor.

2. The method of claim 1, wherein said step of checking whether said satellite configuration is substantially sufficient further includes the steps of:

continuously determining a number N of visible satellites being tracked by said satellite receiver, N being an integer; and declaring said satellite configuration as substantially sufficient if said number N of satellites being tracked is greater than a predetermined number K, K being an integer.

3. The method of claim 1, wherein said step of checking whether said satellite configuration is substantially sufficient further includes the steps of:

continuously determining a number N of visible GPS satellites being tracked by a GPS receiver, N being an integer; and declaring said satellite configuration as substantially sufficient if said number N of GPS satellites being tracked is greater than a predetermined number 4 for a three-dimensional determination of position fixes of said moving platform.

4. The method of claim 1, wherein said step of checking whether said satellite configuration is substantially sufficient further includes the steps of:

continuously determining a number N of visible GPS satellites being tracked by said GPS receiver, N being an integer; and declaring said satellite configuration as substantially sufficient if said number N of GPS satellites being tracked is greater than a predetermined number 3 for a two-dimensional determination of position fixes of said moving platform.

5. The method of claim 1, wherein said step of checking whether said satellite data obtained from said substantially sufficient satellite configuration is substantially sufficient further includes the steps of:

continuously computing a horizontal protection level (HPL) and a vertical protection level (VPL);

checking whether said horizontal protection level (HPL) is less than a horizontal alert limit (HAL);

if said horizontal protection level (HPL) is less than said horizontal alert limit (HAL), declaring a receiver autonomous integrity monitoring (RAIM) function available and declaring said satellite data obtained by using said satellite receiver as substantially sufficient for obtaining position fixes of said moving platform; and if said horizontal protection level (HPL) is greater than said horizonal alert limit (HAL), declaring said receiver autonomous integrity monitoring (RAIM) function unavailable and declaring said satellite data obtained by using said satellite receiver as not substantially sufficient for obtaining position fixes of said moving platform.

6. The method of claim 5, wherein said step of supplementing said satellite data by said satellite-calibrated baro data further includes the steps of:

checking whether said baro data is satellite-calibrated;

if said baro data is satellite-calibrated, adding said satellite-calibrated baro data to said satellite data to recompute said horizontal protection level (HPL) in order to obtain a baro-calibrated horizontal protection level ($HPL_{baro}$) and in order to activate said receiver autonomous integrity monitoring (RAIM) function;

checking whether said baro-calibrated horizontal protection level ($HPL_{baro}$ is less than said horizontal alert limit (HAL);

if said baro-calibrated horizontal protection level ($HPL_{baro}$) is less than said horizontal alert limit (HAL), declaring said receiver autonomous integrity monitoring (RAIM) function available; and if said baro data is not satellite-calibrated, declaring said receiver autonomous integrity monitoring (RAIM) function unavailable.

7. The method of claim 5, wherein said step of supplementing said satellite data by said satellite-calibrated baro data further includes the step of:

calibrating said baro data with said satellite data.

8. The method of claim 7, wherein said step of calibrating said baro data with said satellite data further includes the steps of:

checking whether a raw baro data is available and valid;

if said raw baro data is available and valid, computing a maximum weighted vertical dilution of precision with one satellite removed at one time (max {SubWVDOP});

checking whether said max {SubWVDOP} is less than a predetermined threshold (TSUB);

if said max {SubWVDOP} is less than said TSUB, checking whether a test statistic is less than a predetermined test threshold (TST);

if said max {SubWVDOP} is less than said TSUB and if said test statistic is less than said TST, calibrating said satellite data with said baro data; and if max {SubWVDOP} is greater than said TSUB, or if said test statistic is greater than said TST, declaring said satellite data as unfit for calibrating said raw baro data.

9. The method of claim 8, wherein said step of computing said maximum weighted vertical dilution of precision with one satellite removed at one time (max {SubWVDOP}) further includes the steps of:

using a pre-computed vertical protection level (VPL) in each configuration of said visible satellites for computation of a vertical slope maximum (VSLOPEMAX), wherein said vertical slope maximum (VSLOPEMAX) is a maximum vertical slope of said visible satellites;

identifying an estimated vertical error (EVE) for said visible satellites;

inputting said pre-computed vertical slope maximum (VSLOPEMAX) and said pre-computed estimated vertical error (EVE);

computing an unnormalized maximum weighted vertical dilution of precision with one satellite removed at one time Un_normalized_max {SubWVDOP} for said visible satellites by utilizing said EVE and said VSLOPEMAX; and computing a normalized maximum weighted vertical dilution of precision Normalized_max {SubWVDOP} by using said Un_normalized_max {SubWVDOP}.

10. The method of claim 5, wherein said step of supplementing said satellite data by said satellite-calibrated baro data further includes the step of:

calibrating said baro data with a GPS satellite data.

11. The method of claim 10, wherein said step of calibrating said baro data with said GPS data further includes the steps of:

checking whether a raw baro data is available and valid;

if said raw baro data is available and valid, computing a maximum weighted vertical dilution of precision with one satellite removed at one time (max {SubWVDOP});

checking whether said max {SubWVDOP} is less than a predetermined threshold (TSUB);

if said max {SubWVDOP} is less than said TSUB, checking whether a test statistic is less than a predetermined test threshold (TST);

if said max {SubWVDOP} is less than said TSUB and if said test statistic is less than said TST, calibrating said GPS data with said baro data; and if max {SubWVDOP} is greater than said TSUB, or if said test statistic is greater than said TST, declaring said GPS data as unfit for calibrating said raw baro data.

12. The method of claim 11, wherein said step of computing said maximum weighted vertical dilution of precision with one GPS satellite removed at one time (max {SubWVDOP}) further includes the steps of:

using a pre-computed vertical protection level (VPL) in each configuration of said visible GPS satellites for computation of a vertical slope maximum (VSLOPEMAX), wherein said vertical slope maximum (VSLOPEMAX) is a maximum vertical slope of said visible GPS satellites;

identifying an estimated vertical error (EVE) for said visible GPS satellites;

inputting said pre-computed vertical slope maximum (VSLOPEMAX) and said pre-computed estimated vertical error (EVE);

computing an unnormalized maximum weighted vertical dilution of precision with one GPS satellite removed at one time Un_normalized_max {SubWVDOP} for said visible GPS satellites by utilizing said EVE and said VSLOPEMAX; and computing a normalized maximum weighted vertical dilution of precision Normalized_max {SubWVDOP} by using said Un_normalized_max {SubWVDOP}.

* * * * *